No. 846,087. PATENTED MAR. 5, 1907.
S. W. BRADT.
FOLDING PASTE TABLE AND TOOL BOX.
APPLICATION FILED FEB. 1, 1906.
2 SHEETS—SHEET 2.
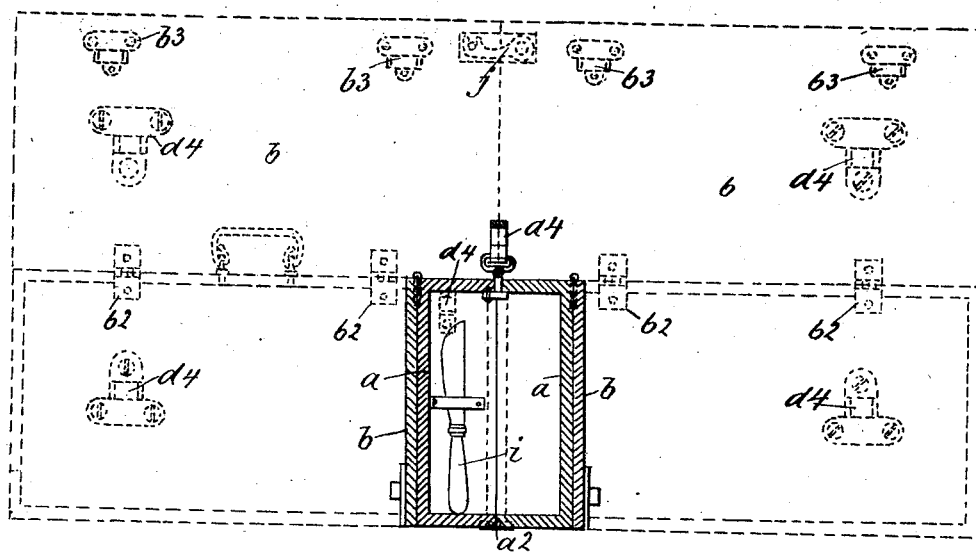
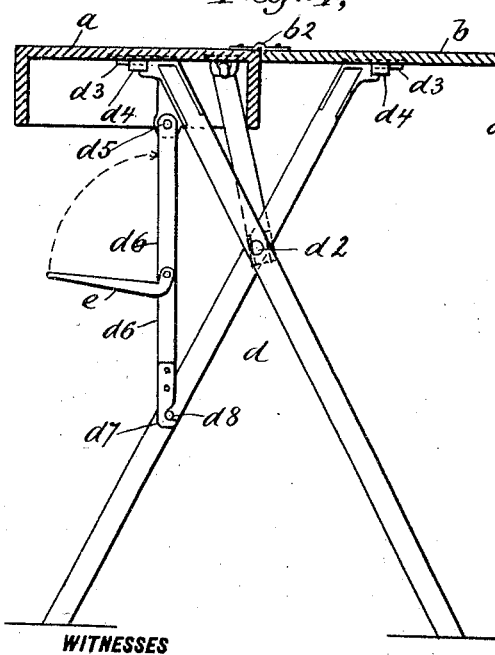
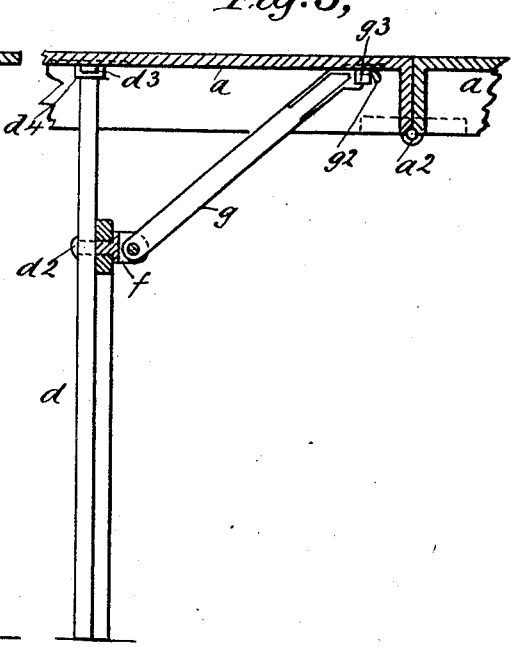
WITNESSES
INVENTOR
Samuel W. Bradt,
BY
ATTORNEYS

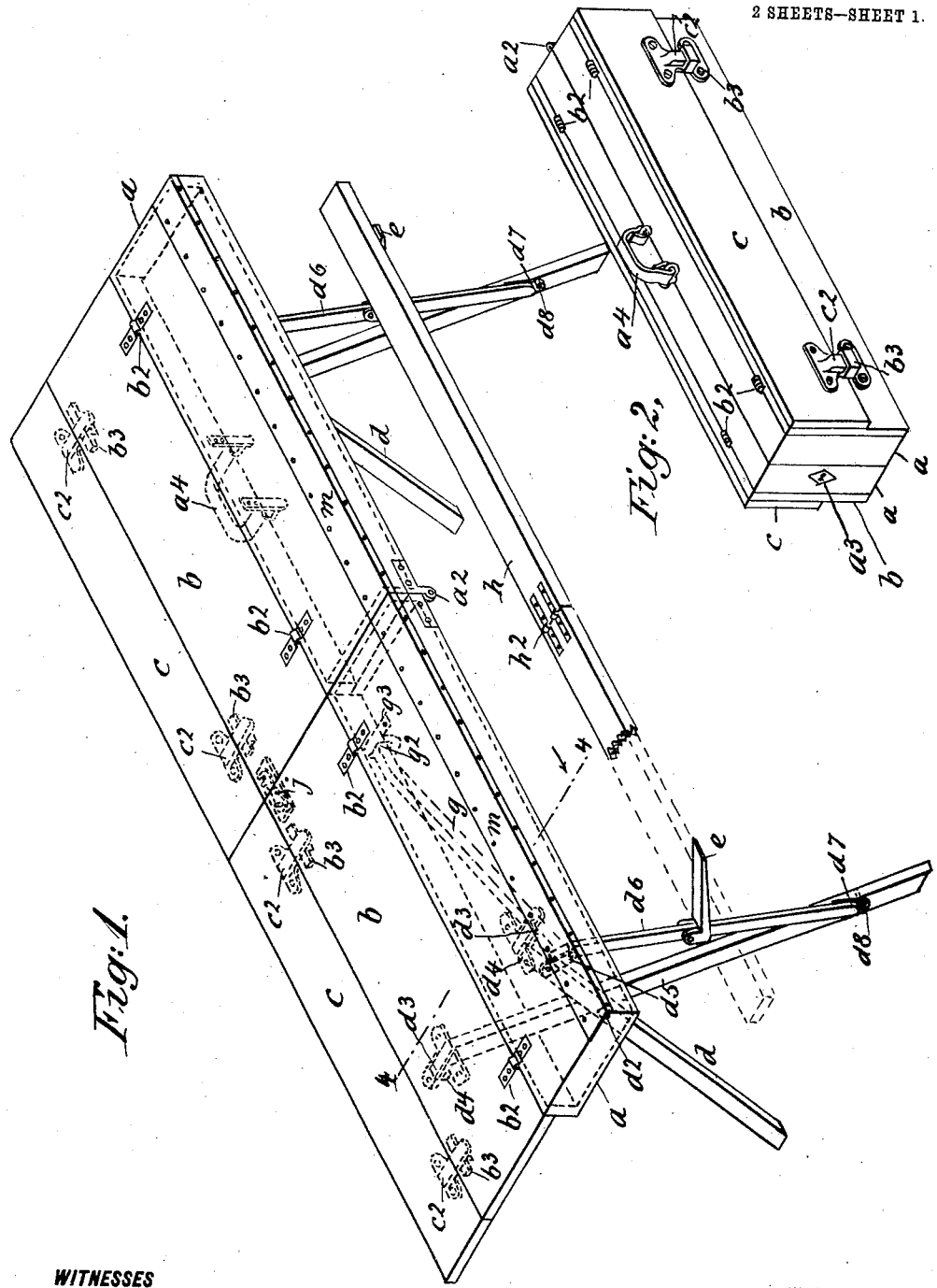

UNITED STATES PATENT OFFICE.

SAMUEL W. BRADT, OF WEST SAND LAKE, NEW YORK, ASSIGNOR OF ONE-HALF TO HARRY E. CLINTON, OF TROY, NEW YORK.

FOLDING PASTE-TABLE AND TOOL-BOX.

No. 846,087.     Specification of Letters Patent.     Patented March 5, 1907.

Application filed February 1, 1906. Serial No. 298,931.

*To all whom it may concern:*

Be it known that I, SAMUEL W. BRADT, a citizen of the United States, and residing at West Sand Lake, in the county of Rensselaer and State of New York, have invented certain new and useful Improvements in Folding Paste-Tables and Tool-Boxes, of which the following is a specification, such as will enable those skilled in the art to which it appertains to make and use the same.

This invention relates to paste-tables for use by paper-hangers; and the object thereof is to provide an improved combination device of this class adapted for use as a table and as a tool-box, said device being adapted to be folded compactly together into the form of a box or case and being also adapted to be extended for use as a paste-table whenever desired.

The invention is fully disclosed in the following specification, of which the accompanying drawing forms a part, in which the separate parts of my improvement are designated by suitable reference characters in each of the views, and in which—

Figure 1 is an isometric perspective view of my improvement extended for use as a paste-table. Fig. 2 is a similar view, showing the device folded together in the form of a box or case; Fig. 3, a partial transverse section of the device as shown in Fig. 2 and showing in dotted lines a partial development of the device into the form shown in Fig. 1; Fig. 4, a transverse section on the line 4 4 of Fig. 1, and Fig. 5 a sectional detail view at right angles to that shown in Fig. 4.

In the practice of my invention I provide two oblong box-shaped members $a$, which are similar in all respects and open at one side, and said members $a$ are hinged together at one end, as shown at $a^2$ in Figs. 1 and 5, and are adapted to be folded together to form an oblong box or case, as shown in Fig. 2, the shape of said box or case being similar to that of a dress-suit case. The members $a$ are provided at the end opposite the hinge connection at $a^2$ with a lock $a^3$, by which the said separate members are locked together, and one of said parts is provided at the top thereof, when the device is folded into the form of a box or case, with a handle $a^4$.

The separate members or parts $a$ are provided at their corresponding edges and at the outer top edges, when the device is folded together into the form of a box or case, with hinged plates or boards $b$, forming table members, the hinges being shown at $b^2$, and separate detachable supplemental plates or boards $c$ are also provided, and the said plates or boards $c$ are provided at one edge with projecting tongues $c^2$, adapted to enter keepers $b^3$, with which the table members $b$ are provided. I also provide two sets of legs $d$, the separate members of which are pivoted together at $d^2$ and provided at their upper ends with tongues $d^3$, adapted to be passed through keepers $d^4$, secured to the bottom of the table members $b$ and to the inner side of the box or case members $a$, as clearly shown in full lines in Figs. 4 and 5 and as indicated in dotted lines in Fig. 1. The tongues $d^3$ range transversely of the box or case members $a$ and of the table members $b$, while the keepers $d^4$ range longitudinally of said parts, and pivoted to the top portion of one leg of each set, as shown at $d^5$, is a brace member $d^6$, provided at its free end with a hook $d^7$, adapted to be connected with a pin $d^8$, secured to the other leg member of each set, and pivoted centrally of each of the brace members $d^6$ is a support $e$, adapted to be held in a horizontal position and to be folded parallel with the corresponding brace member $d^6$.

The pivot-pin $d^2$, by which the separate leg members of each set are connected, is provided at its inner end with a yoke-shaped head $f$, and to the heads $f$ of the pivot-pins $d^2$ are hinged braces $g$, provided at their free ends with hooks $g^2$, adapted to be passed through keepers $g^3$, secured to the bottom of the box or case members $a$. Only one of the braces $g$ is indicated in Fig. 1; but it will be understood in practice that one of these braces may be provided at both ends of the table or connected with both sets of legs $d$, if desired.

The supports $e$ are designed to hold a straight-edge $h$, composed of two parts hinged together at $h^2$, and in practice the said straight-edge $h$ may be folded and placed in the box or case formed by the separate parts or members $a$, and said box or case may also be used for holding a knife, as shown at $i$ in Fig. 3, together with any other or all tools employed by paper-hangers.

The independent plates, boards, or table members $c$ are not shown in Figs. 3, 4, and 5, but are shown in Figs. 1 and 2, said parts being shown in their position as parts of the table in Fig. 1, and the method of connecting them with the box or case members when the latter are folded in the form of a box or case being shown in Fig. 2.

The table members, plates, or boards $b$ are also provided at their adjacent ends and on the inner or under side thereof with a catch $j$. (Indicated in Fig. 3.)

In setting up the device as a table or extending the parts of the device to serve as a table the brace members $g$ of the legs $d$ are first secured to the keepers $g^3$, and the upper ends of the separate leg members of each set are then expanded and connected with the keepers $d^4$, and this forms a strong and substantial table for the purpose described.

The brace members $d^6$, which carry the pivoted supports $e$, on which in practice the straight-edge is placed, also serve to lock the separate members of the separate pairs of legs together and hold them in the position shown in Fig. 4, and it will be understood that the brace members $d^6$ are connected with the pins $d^8$ after the tongues $d^3$ have been passed through the keepers $d^4$, and in this way the separate pairs or sets of leg members are securely locked in position and cannot be detached from the table or the separate parts thereof until after the brace members $d^6$ are disconnected from the pin $d^8$.

The front side edges of the parts or members $a$ are also provided in practice with metal strips $m$, as shown in Fig. 1, which strengthen said parts and prevent injury thereto, and these metal strips also form a cutting edge for cutting off lengths, strips, or sheets of paper while the roll is held on the table by means of the straight-edge, and it will be understood that the use of the straight-edge and all other tools is the same with this as with other apparatus for a similar purpose.

By means of my improvement I provide a paper-hanger's table which may be compactly folded together into the form of a box or case, which will serve as a receptacle for the tools used in the trade, and the legs $d$ and the parts connected therewith, together with the straight-edge $h$, may also be folded together and placed in said box or case, and said box or case also serves as a receptacle for an amount of paper when desired and which may be conveniently carried from one point to another or transported in the manner of an ordinary dress-suit case.

Having fully described my invention, what I claim as new, and desire to secure by Letters Patent, is—

1. A paper-hanger's table composed of separate oblong box or case members open at one side and hinged together at one end and adapted to be folded together to form an oblong box or case, said box or case members being provided at their corresponding outer longitudinal edges with hinged table members, and said hinged table members being provided with supplemental table members which are adapted to be detachably connected therewith, the means for connecting the supplemental table members with the hinged table members when the latter are in position for use being also employed for connecting the supplemental table members with the sides of the box or case when the parts of the table are folded together to form such box or case, the sides of said box or case being formed by the hinged table members.

2. A foldable table of the class described provided with a plurality of sets of legs, the separate parts of which are connected by pivot-pins and provided at their upper ends with tongues adapted to engage keepers secured to the bottom of the table members, brace members pivoted to the pivot-pins by which the leg members of each set are connected and provided at their free ends with hooks adapted to engage keepers secured to the bottom of the table members, one leg member of each set being provided with a brace member which is pivoted to the top portion thereof and the free end of which is adapted to be connected with the bottom portion of the corresponding leg member of each set, said braces being also provided with pivoted supports adapted to be held in a horizontal position for supporting a straight-edge bar and to be folded adjacent to said braces.

In testimony that I claim the foregoing as my invention I have signed my name, in presence of the subscribing witnesses, this 31st day of January, 1906.

SAMUEL W. BRADT.

Witnesses:
F. A. STEWART,
C. E. MULREANY.